Feb. 4, 1947.  A. E. SKOLRUD  2,415,114
CORN CUTTER
Filed Sept. 18, 1944
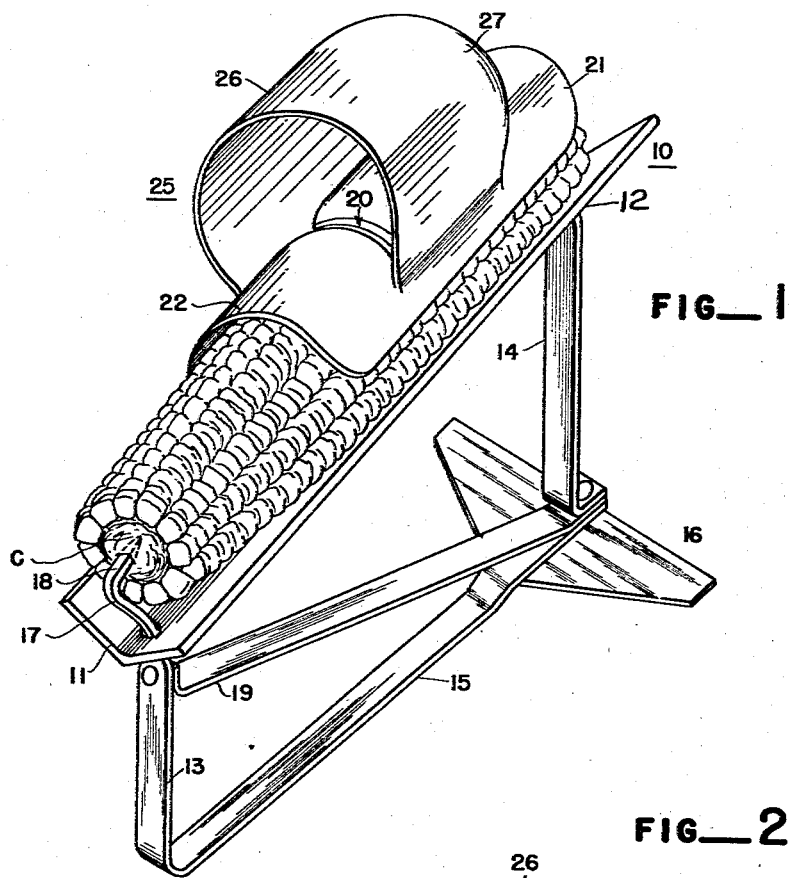
FIG__1
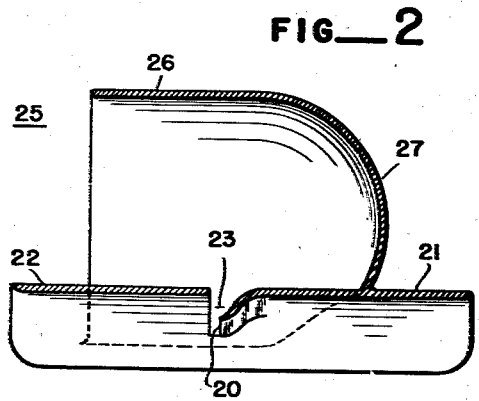
FIG__2
ARTHUR EDWIN SKOLRUD
Inventor
By Smith & Tuck
Attorneys Patented Feb. 4, 1947

2,415,114

UNITED STATES PATENT OFFICE 2,415,114

CORN CUTTER

Arthur Edwin Skolrud, Seattle, Wash.

Application September 18, 1944, Serial No. 554,588

2 Claims. (Cl. 146—4)

This invention relates to a corn cutter and more particularly, is a mechanism for removing the kernels from ears of corn with facility in a manual operation.

While it is recognized that there are suitable mechanisms for processing ears of corn in the large cannery operations, the housewife, chef and other food processors who wish to shell corn on a limited scale, are forced to the old expediency of using a hand knife and holding the ears manually. Such an operation is both slow and dangerous, because of the many cuts that must be taken in the close proximity of the fingers of the hands when grasping the ear while cutting.

Having in mind the defects of the prior art, it is an object of this invention to provide a corn cutter that is manually operable with facility to rapidly and cleanly remove corn kernels from the cob.

Another object of the invention is the provision, in a corn cutter as described, of a deflector element, which during cutting, directs the kernels in a uniform manner to a receiving receptacle.

A still further object of the invention is to provide, in a corn cutter of the type mentioned, an arched cutting mechanism that substantially conforms to the cross-section of the ear, and is guided and held in proper cutting position thereon by saddle means, to the end that professional work may easily be performed by relatively unskilled persons.

The foregoing objects and others ancillary thereto, I prefer to accomplish as follows:

According to a preferred embodiment of my invention, I mount in an inclined plane a V-shaped trough adapted to receive an ear of corn, and having in its lower portion, a stop to restrain longitudinal movement of an ear placed against the stop, and to hold the same in the trough. The cutting operation is performed toward the stop by means of an arched blade or cutter that is downwardly open to straddle the ear of corn, and as it is moved toward the end thereof against the stop, to urge the same tightly against dislodgement from the stop. Specifically, the stop is shown as a pointed hook-shaped member which empales the cob, and functions also as a pivot during revolution of the ear within the trough for the purpose of presenting additional kernels for cutting. The arched or arcuate cutter is a part of the saddle arrangement that I have devised, which includes front and rear tandem portions spaced apart longitudinally from each other. The forward edge of the rear saddle portion carries the cutter, which is offset downwardly into the saddle, and the corn as it is cut from the cob, passes upwardly through the space between the saddle portions. Mounted upon the saddle portions, above the cutter in operative position of the same, is a cup-shaped deflector, into which the kernels pass from the cutter, and by means of which they are deflected during the cutting operation into a receiver or pan. This cup-shaped deflector member has one side open to the saddles, which latter close upon the same, and it also has a forwardly open mouth through which the kernels are discharged during the cutting operation by deflective action. Externally, the cup-shaped deflector may be grasped manually for the manipulation of the cutter.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawing, in which:

Figure 1 is a perspective view of my corn cutter as it appears in use, and

Figure 2 is a longitudinal sectional view through the cutting and deflecting elements.

A corn cutting mechanism to overcome the defects of the prior art must have at least two totally distinct characteristics; it must be capable of operation by relatively unskilled persons without danger of injury, and it must also be capable of rapidly and efficiently cutting kernels from ears of corn.

Accordingly, a preferred embodiment of my invention, referring to Figure 1 of the drawing, is constituted by a holder into which is placed an ear of corn, and a cutter which co-operates therewith to remove the kernels from the cob. The holder comprises the V-shaped trough 10 that is supported with one end 11 lower than the other end 12. This inclined position is obtained by means of the supporting legs 13 and 14, rising at either end from the base 15, which is laterally broadened by foot-plate 16, to prevent the assembly from tipping during use.

In the lower portion 11 of the trough 10, I provide a stop for preventing longitudinal movement of a cob, as C in the drawing. In the illustrated form of the invention, the stop comprises the hook 17, which has a pointed end 18, for empaling the cob end, and which may also serves as a pivot for the cob as it is indexed about its axis during cutting. The brace 19 diagonally between legs 13 and 14, stiffens the supporting frame.

For the purpose of removing kernels from the corn cob, and for the additional purpose of holding the cob against the stop during cutting, I employ the arched cutter 20, which is a blade having a fairly sharp edge. The blade is supported in proper cutting position by rear saddle member 21 and forward saddle member 22, which are arranged together in tandem, but spaced apart, relationship on either side of the cutter. The cutting blade 20 is carried by the forward portion of saddle 21, and is offset therefrom as can best be seen in Figure 2. Between the offset blade edge and the rear of saddle 22, is the slot or passage 23, through which the corn kernels pass after being cut.

A cup-shaped deflector 25 comprising the cylindriform wall 26 is forwardly open on one end and has the rounded bottom wall 27. Deflector 25 is attached to the saddles in such a manner as to enclose from above the cutter 20 and the slot 23. It will be noted that the cupped member functions also as a handle for grasping the cutting mechanism during manipulation of the same.

When an ear of corn is placed in the sloping V-shaped trough 16, against stop 17, the cutter may be reciprocally moved therealong in one direction, both forcing the ear against the stop and also cutting the kernels therefrom; and in the other direction, being drawn back preparatory to making the next cutting stroke. During withdrawal of the cutter and the deflector cup, the operator's free hand may be employed to index the ear about its axis, so that the next rows of the kernels will be presented for cutting.

As the kernels are cut from the cob, they pass through slot 23 to above the saddles and into the cup-shaped deflector 25, by which they are directed over the forward end of the trough into a pan or onto another receiving surface for accumulation. Because of the downard inclination, as well as the movement, of the cupped member 25, the cut kernels do not accumulate therein, but are deposited as described. Pressure that is applied to the ear of corn forces the same against the stop and also tends to anchor the trough and its supporting base against the table surface on which it may be resting, so that ordinarily it is not necessary to clamp or otherwise secure the supporting structure by clamps or fasteners.

By varying the degree of offset of the cutter 20, the kernels may be cleanly cut from the ear to produce "whole kernel" corn or they may be comminuted and minutely cut to produce "creamed style" corn. In the first instance, the offset is sufficient to place the cutting edge at or near the base of the kernels where they join the cob, and in the second instance, the cutting edge will pass through the kernels near their outer surfaces more nearly simulating a scraping rather than a cutting action.

While I have shown and described particular embodiments of my invention, it will occur to those skilled in the art that various changes and modifications may be made without departing from the invention, and I therefore aim, in the appended claims, to cover all such changes and modifications as fall within the true spirit and scope of my invention.

Having thus described my invention, I claim:

1. A corn cutter, comprising: a V-shaped trough for supporting an ear of corn, means for supporting said trough with one end lower than the other, a stop at the lower end of said trough for preventing longitudinal movement therein of a supported ear of corn, a rear saddle having a forward edge downwardly off-set to form an arcuate cutting edge for removing kernels from such an ear and for forcing the same against said stop, a forward saddle tandem to and spaced apart from said rear saddle, and a forwardly opening cup-shaped deflector placed on said saddles and having an open side closed thereby and adapted to be grasped for manual manipulation of the cutter, said deflector having its closed end over said rear saddle and its mouth over the forward saddle.

2. A corn cutter, comprising: a rear saddle having a forward edge downwardly off-set to form an arcuate cutting edge for removing kernels from an ear of corn, a forward saddle tandem-to and spaced apart from said rear saddle, and a forwardly opening cup-shaped deflector placed on said saddles and having an open side closed thereby and adapted to be grasped for manual manipulation of the cutter, said deflector having its closed end over said rear saddle and its mouth over the forward saddle.

ARTHUR EDWIN SKOLRUD.

REFERENCES CITED

The following references are of record in the file of this patent:

UNITED STATES PATENTS

| Number | Name | Date |
| --- | --- | --- |
| 2,285,567 | Carroll | June 9, 1942 |
| 889,434 | Bustanoby | June 2, 1908 |

FOREIGN PATENTS

| Number | Country | Date |
| --- | --- | --- |
| 60,073 | Swedish | Jan. 6, 1926 |
| 306,578 | German | July 2, 1918 |